(12) United States Patent
Migdal et al.

(10) Patent No.: US 12,131,224 B1
(45) Date of Patent: Oct. 29, 2024

(54) DEEP LEARNING BASED IMAGE ENHANCEMENT FOR BARCODE DECODING

(71) Applicant: Amazon Technologies, Inc., Seattle, WA (US)

(72) Inventors: Joshua Nicholas Migdal, Wayland, MA (US); Frank Preiswerk, Brooklyn, NY (US)

(73) Assignee: Amazon Technologies, Inc., Seattle, WA (US)

(*) Notice: Subject to any disclaimer, the term of this patent is extended or adjusted under 35 U.S.C. 154(b) by 1 day.

(21) Appl. No.: 18/057,112

(22) Filed: Nov. 18, 2022

(51) Int. Cl.
*G06K 7/14* (2006.01)
*G06T 3/40* (2006.01)
*G06T 5/00* (2024.01)
*G06T 5/50* (2006.01)

(52) U.S. Cl.
CPC ......... *G06K 7/1465* (2013.01); *G06K 7/1413* (2013.01); *G06K 7/1443* (2013.01); *G06T 3/40* (2013.01); *G06T 5/00* (2013.01); *G06T 5/50* (2013.01); *G06T 2207/20081* (2013.01)

(58) Field of Classification Search
CPC .. G06K 7/1404; G06K 7/1443; G06K 7/1473; G06K 7/1465; G06K 7/1413; G06K 7/1417; G06K 7/1447; G06K 7/1408; G06T 3/40; G06T 5/00; G06T 5/50; G06T 2207/20081; G06T 2207/20012; G06T 2207/20008; G06T 5/60
See application file for complete search history.

(56) References Cited

U.S. PATENT DOCUMENTS

| 2019/0026587 A1* | 1/2019 | Simpson | G06V 30/1478 |
| 2019/0108379 A1* | 4/2019 | Bachelder | G06K 7/1452 |

FOREIGN PATENT DOCUMENTS

| WO | WO-2019148154 A1 * | 8/2019 | A61B 34/10 |
| WO | WO-2022115314 A1 * | 6/2022 | G06T 7/0004 |

OTHER PUBLICATIONS

Ren, "Barcode detection and decoding method based on deep learning" (Year: 2019).*
Quenum, "Fast, Accurate Barcode Detection in Ultra High-Resolution Images" (Year: 2021).*

* cited by examiner

*Primary Examiner* — Thien T Mai
(74) *Attorney, Agent, or Firm* — Kilpatrick Townsend & Stockton LLP

(57) ABSTRACT

Systems and techniques for reading a structured identifier are provided. One technique involves obtaining a set of images of an item with a structured identifier. A region of interest (ROI) of the structured identifier within a first image of the set of images is determined. A second image comprising the ROI of the structured identifier is generated. An enhanced version of the second image is generated, based on processing the second image with at least one image restoration model. The structured identifier is decoded from the enhanced version of the second image to obtain data corresponding to the structured identifier.

20 Claims, 17 Drawing Sheets

DEEP LEARNING BASED IMAGE ENHANCEMENT FOR BARCODE DECODING

BACKGROUND

The present disclosure relates to systems and techniques for reading structured identifiers using camera-based scanning systems.

Retailers, wholesalers, and other product distributors typically maintain an inventory of various items that may be ordered, leased, borrowed, rented, viewed, and so forth, by clients or customers. For example, an e-commerce website may maintain inventory in a fulfillment center. In this example, when a customer orders an item, the item is picked from inventory, routed to a packing station, packed, and shipped to the customer. Facilities generally use structured identifiers, such as barcodes, to identify and track items through various stages of the facility. A barcode, for example, is typically a set of symbols that stores identifying information about an item associated with the barcode. The barcode on a given item can be read, decoded, and processed to extract the data for a variety of applications (e.g., pricing, order fulfillment, sortation, shipping, etc.).

BRIEF DESCRIPTION OF DRAWINGS

Various embodiments in accordance with the present disclosure will be described with reference to the drawings, where like designations denote like elements. Note that the appended drawings illustrate typical embodiments and are therefore not to be considered limiting; other equally effective embodiments are contemplated.

DETAILED DESCRIPTION

Figure 1:
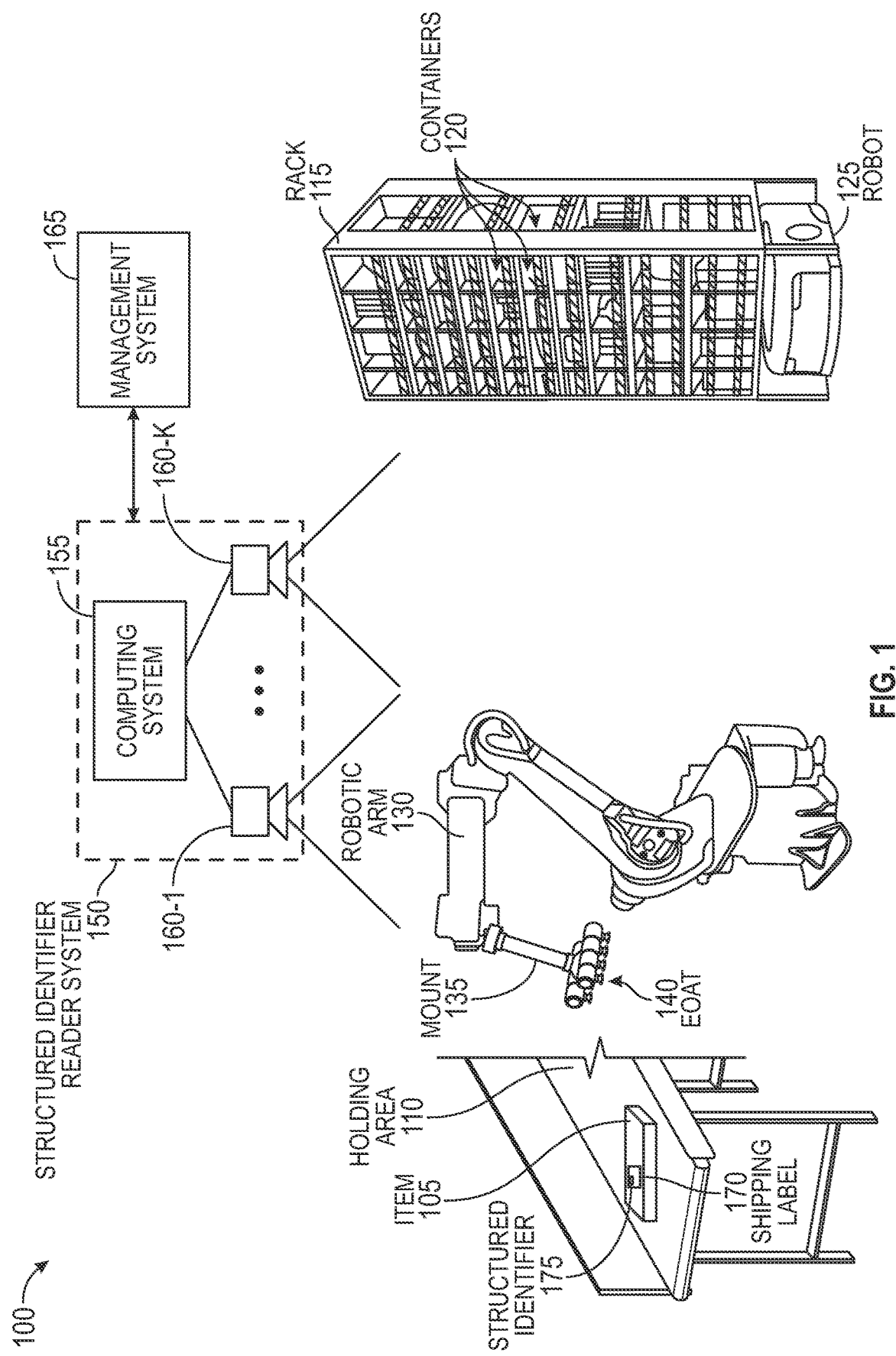
FIG. 1 illustrates an example system, according to one embodiment.

A facility (e.g., shipping warehouse, fulfillment center, etc.) can perform tasks such as sorting items, picking items, shipping items, storing items, and the like. As an example, an item may be retrieved from storage and transported to a location in preparation for stowing in a container. In another example, an item can be retrieved (or picked) from a container in preparation for shipping. Such facilities may use structured identifiers on items in order to identify and keep track of the items throughout multiple facility operations. For example, for certain tasks, a facility can use a computer-vision system to process data received from camera-based (or image-based) structured identifier reader(s) (or scanner(s)) in the facility. Such a computer-vision system can use the camera-based structured identifier reader(s) to detect and read (or decode) structured identifiers (e.g., linear barcodes, one-dimensional (1D) barcodes, two-dimensional (2D) barcodes, etc.) on various items (or packages) in the facility. The structured identifier on an item may include identifying information for the item (e.g., globally unique identifier), target location information for the item, item attributes, etc. Structured identifiers can be applied to items (or packages) using different types of labels (also referred to as label stickers, shipping labels, etc.), such as Scan, Label, Manifest, Apply (SLAM) labels, Fulfillment Network Stock Keeping Unit (FNSKU) labels, etc.

In facilities that employ camera-based structured identifier readers, the conventional process for reading structured identifiers generally involves capturing image(s) of a structured identifier on an item, localizing (e.g., identifying and locating) the structured identifier on the item within the image(s), generating, based on the localization, a cropped image with the structured identifier, and decoding the structured identifier from the cropped image. One challenge associated with this conventional process is that it can cause inaccurate decoding of structured identifiers. For example, the captured images and/or cropped images may have a variety of image defects, including, but not limited to, blurred images, lighting defects, image noise, low sharpness, distortions, compression artifacts (e.g., Joint Photographic Experts Group (JPEG) artifacts), etc., that impact the ability of the camera-based structured identifier reader to accurately decode the structured identifier.

In facilities that use structured identifiers on items for a variety of facility tasks (e.g., identifying items, tracking items, sorting items, delivering items, etc.), the ability to accurately read a structured identifier is critical to the performance of the facility operations. For example, inaccurately reading a structured identifier on an item can cause the facility to lose track of the item, cause the facility to deliver the item to an incorrect destination, and the like.

As such, embodiments described herein provide improved systems and techniques for reading structured identifiers on items using camera-based scanning systems. In one embodiment described herein, a technique for reading structured identifiers includes enhancing an image of a structured identifier using an image restoration model and decoding the structured identifier from the enhanced image. In such an embodiment, the structured identifier within the image that is captured via a camera-based scanning system may be non-decodable due to one or more image defects (e.g., image noise, blurriness, low sharpness, low lighting, low contrast, compression artifacts, etc.). The image restoration model may be configured to enhance the image, such that the structured identifier becomes decodable. The camera-based scanning system may then decode the structured identifier from the enhanced image to obtain information associated with the item on which the structured identifier is located. In this manner, embodiments described herein can enable a facility to significantly reduce the occurrence of inaccurate structured identifier decodes, and in turn, significantly increase the performance of facility operations.

Note that while embodiments herein primarily discuss camera-based scanning systems within a facility, such as a fulfillment center, this disclosure is not limited to such environments and can be used for other applications. For example, the techniques described herein could be used in retail stores (e.g., to identify and track items for sale), in postal service locations (e.g., to identify and track mail), or in any environment in which a structured identifier is involved. Additionally, while embodiments herein primarily use "barcodes" as a reference example of a structured identifier, the structured identifier can include any type of globally unique identifier used to identify an item. Examples of such structured identifiers can include visual and/or geometric features of a label (e.g., ridges, edges, pixel value intensity changes), text, 1D barcodes, two-dimensional (2D) barcodes, etc.

Additionally, note that, as used herein, the "quality" of an image may refer to (or be based on) one or more image attributes, such as sharpness, noise, dynamic range, resolution, contrast, etc. A "high quality" image, for example, may include a higher sharpness, lower noise, higher dynamic range, higher resolution, etc. relative to a "low quality" image. Similarly, a "low quality" image, for example, may include a lower sharpness, higher noise, lower dynamic range, lower resolution, etc., relative to a "high quality" image.

Additionally, note that the terms "reading" a structured identifier (or structured identifier reading) and "decoding" a structured identifier (or structured identifier decoding) may be used interchangeably and may refer to analyzing an image of a structured identifier to extract the alphanumeric string or binary information (or data) within the structured identifier. Likewise, note that the terms "locating" a structured identifier, "localizing" a structured identifier, and "detecting" a structured identifier may be used interchangeably and may refer to identifying a structured identifier within an image and determining (e.g., computing) the location of the structured identifier, without the structured identifier being decoded.

FIG. 1 illustrates a system 100 with a structured identifier reader system 150, according to one embodiment. In one embodiment, the system 100 is a (robotic) stowing or picking system. The system 100 may be located in a facility (e.g., warehouse, factory, distribution center, etc.). In a particular embodiment, the system 100 is located in a fulfillment center that performs various operations in order to ship items to customers. Here, for example, the system 100 includes a rack 115 (also referred to as an inventory holder) that includes multiple containers 120 (for holding or storing items 105). The system 100 also includes a robot 125 that can pick up and move the rack 115 to a particular (or desired) location. The system 100 further includes a robotic arm 130 that can access the containers 120 on the rack, e.g., for a robotic stowing or picking operation. The rack 115 can have containers on multiple sides that can be accessed via the robot 125 spinning the rack 115 so that each side of the rack 115 can face the robotic arm 130 or a different robotic arm(s) (not shown).

In one embodiment, the robot 125 can move the rack 115 to a position proximate to the robotic arm 130, e.g., to enable the robotic arm 130 to stow items into (or pick items from) the containers 120. In another embodiment, the robotic arm 130 may be mobile and the racks 115 can be stationary. In this case, the robotic arm 130 may move between the racks 115 to perform stow and pick operations.

The robotic arm 130 includes a mount 135, which can support various sensors and end-of-arm tools (EOATs) for stowing and/or picking items from the containers 120. Here, for example, the mount 135 supports an EOAT 140, which includes a suction device for grasping, transporting, and stowing items into a particular container. For example, the EOAT 140 can grasp an item 105 (also referred to as a package or object) located in a holding area 110 (also referred to as an item holding location) and transport the item 105 to a particular container 120. The holding area 110 is representative of a variety of surfaces and can have any form factor suitable for holding items (e.g., table, floor, conveyor belt, etc.).

As shown, the system 100 also includes a structured identifier reader system 150 and a management system 165. The structured identifier reader system 150 is generally configured to capture an image of a structured identifier and decode the structured identifier within the image, using one or more techniques described herein. The structured identifier reader system 150 can include hardware components, software components, or combinations thereof. In the depicted embodiment, the structured identifier reader system 150 includes a computing system 155 and one or more camera device 160 1-K (where K is an integer greater than 1).

In this embodiment, when performing a pick or stow operation, the robotic arm 130 may grasp an item 105 from the holding area 110 and transition the item 105 to a container 120 in the rack 115. As the item 105 is being transitioned from the holding area 110 to the container 120, the camera devices 160 1-K may capture multiple images of the item 105 and perform processing on the images to extract one or more images of the structured identifier 175 on the shipping label 170 of the item 105. The computing system 155 may use or more techniques described herein to enhance the images of the structured identifier 175, and may decode the structured identifier from one or more of the enhanced images. Note, the structured identifier reader system 150 is described in more detail below with respect to FIG. 3.

Note that while FIG. 1 depicts the structured identifier reader system 150 being deployed within a pick or stow system, the structured identifier reader system 150 can be used in other environments. For example, FIGS. 2A-2D illustrate different systems 200 A-D, respectively, according to various embodiments. Each of the systems 200 A-D may include a structured identifier reader system 150 for decoding structured identifiers.

Figure 2B:
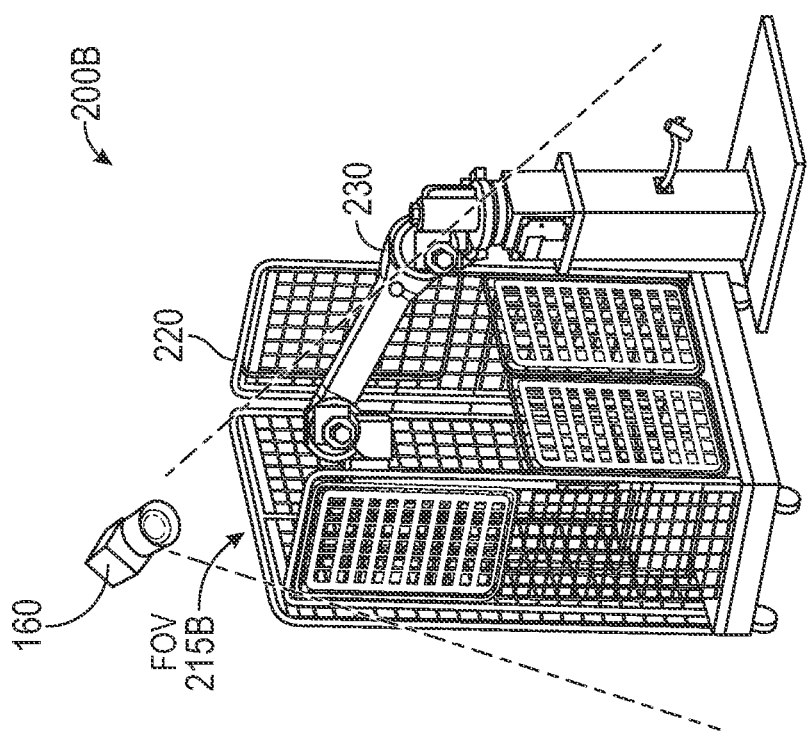
FIGS. 2A-2C illustrate different example systems, according to various embodiments.
Figure 2A:
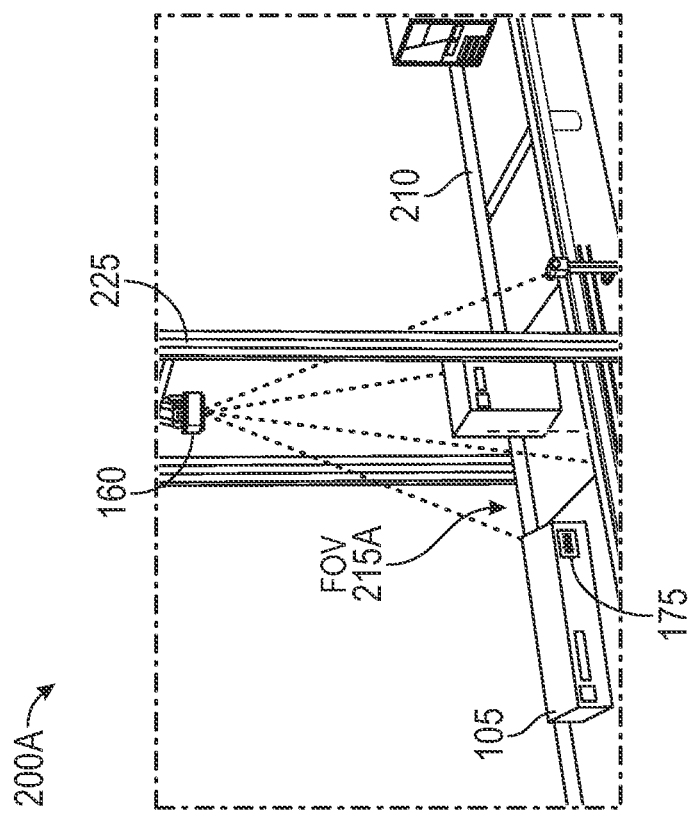

In FIG. 2A, the system 200A includes a conveyor 210, which transitions items 105 under a camera device 160 for item identification. The camera device 160 may be supported by a frame 225 (e.g., the frame 225 may have one or more mounting locations for deploying the camera device 160). The camera device 160 may capture an image of a structured identifier 175 on an item 105 that transitions through a field-of-view (FOV) 215A of the camera device 160. Although one camera device 160 is depicted in the system 200A, note that the system 200A can include any number of camera devices 160 deployed in various locations within the system 200A.

In FIG. 2B, the system 200B includes a robotic arm 230 that packs items 105 into a transport device 220 (e.g., movable cart) and a camera device 160 deployed above the transport device 220. Here, the camera device 160 may capture an image of a structured identifier 175 on an item 105 that is within the FOV 215B of the camera device 160. Although one camera device 160 is depicted in the system 200B, note that the system 200B can include any number of camera devices 160 deployed in various locations within the system 200B.

Figure 2C:
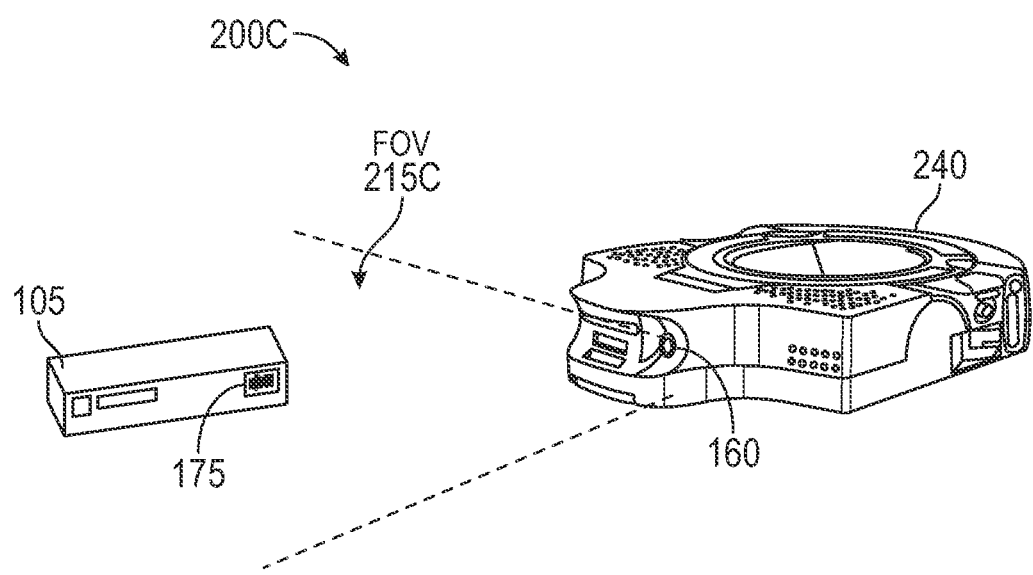

Similarly, in FIG. 2C, the system 200C includes a drive unit 240, which includes a camera device 160. The camera device 160 in system 200C may be used to navigate within the environment, perform obstacle detection (e.g., detecting items within a FOV 215C of the camera device 160), perform obstacle avoidance (e.g., avoiding items in a path of the drive unit 240), etc. In a particular embodiment, the camera device 160 in system 200C is a stereo camera (having two image sensors separated by a baseline). In such an embodiment, each image sensor may capture an image of a structured identifier 175 on an item 105 within the FOV of the image sensor. The images captured by the image sensors may then be enhanced using one or more techniques described herein, and the structured identifier 175 may be decoded from one or more of the enhanced images.

Figure 3:
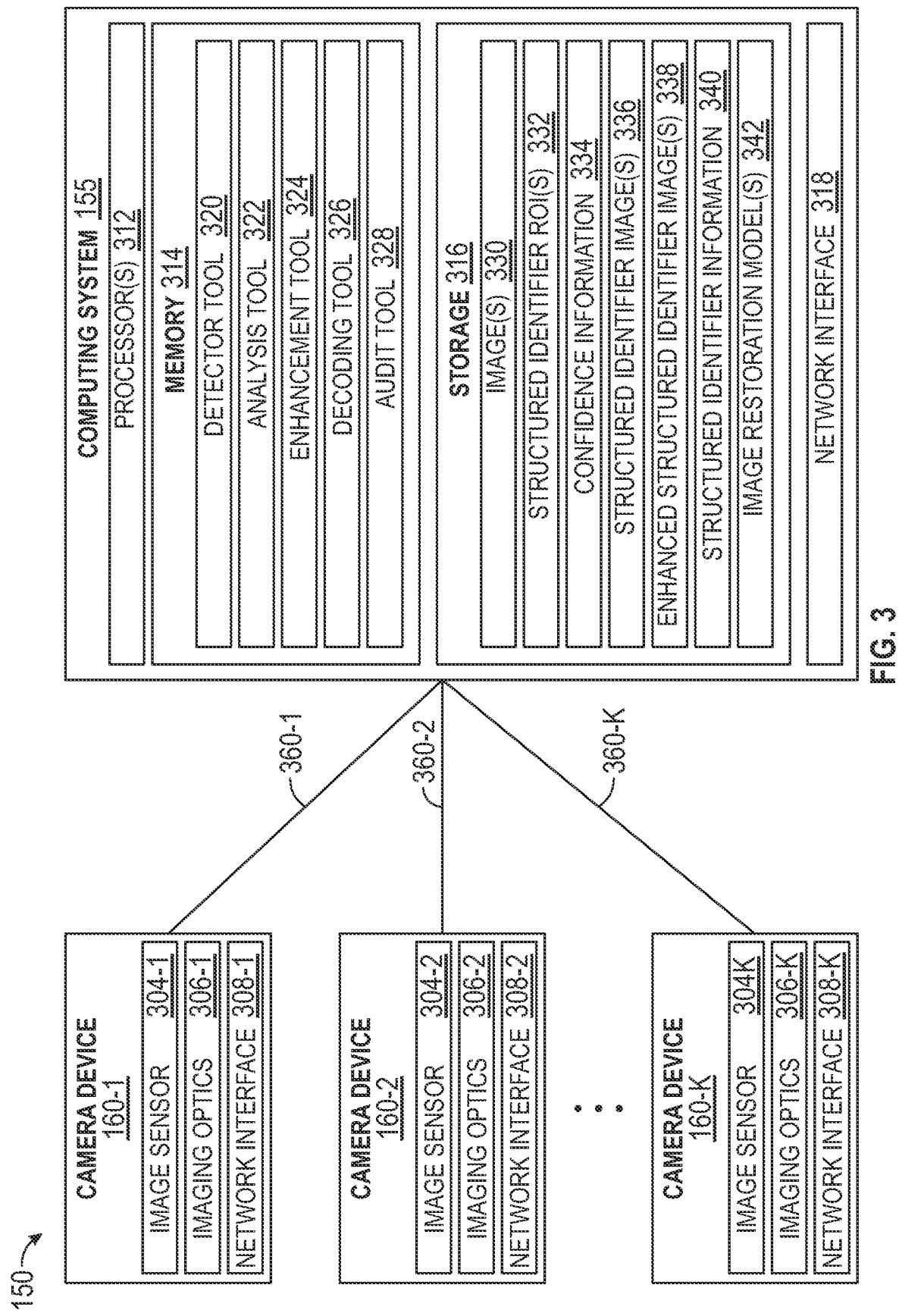
FIG. 3 further illustrates components of a structured identifier reader system described relative to FIG. 1, according to one embodiment.

FIG. 3 further illustrates components of the structured identifier reader system 150 described relative to FIG. 1, according to one embodiment. As shown, the structured identifier reader system 150 includes camera devices 160 1-K connected to a computing system 155. The camera devices 160 1-K may be connected to the computing system 155 via respective communication links 360 1-K, which may be wired or wireless communication links. In one embodiment, the camera devices 160 communicate with the computing system 155 using a wired communication protocol, for example, Ethernet, Universal Serial Bus (USB), such as USB-3, or any wired communication protocol now known or later developed. In another embodiment, the camera devices 160 communicate with the computing system 155 using a wireless communication protocol, WiFi, cellular communications, or any wireless communication protocol now known or later developed.

Each camera device 160 includes an image sensor 304, imaging optics 306, and a network interface 308. The camera device 160 can capture an image of a given item with the image sensor 304. The image sensor 304 is representative of a variety of types of electronic image sensors. The image sensor 304 may use a rolling shutter or a global shutter. The imaging optics 306 may include various optics, such as lens with a particular focal length. The network interface 308 can include any communications interface (e.g., Ethernet, serial, such as USB, wireless, etc.) that allows the camera device 160 to communicate with other computers and/or components in a system (e.g., system 100, system 200A, system 200B, system 200C, etc.).

The computing system 155 may be located on-premises or may be located in a cloud computing environment. For example, the computing elements (or components) may correspond to a physical computing system(s) or may correspond to one or more virtual computing instances executing within a computing cloud. The computing system 155 includes a processor(s) 312, a memory 314, storage 316, and a network interface 318. The processor(s) 312 represents any number of processing elements which can include any number of processing cores. In one embodiment, the processors 312 can include one or more CPUs, one or more GPUs, or combinations thereof.

The memory 314 can include volatile memory, non-volatile memory, or combinations thereof. The storage 316 may be a disk drive storage device. Although shown as a single unit, the storage 316 may be a combination of fixed and/or removable storage devices, such as fixed disc drives, removable memory cards, or optical storage, network attached storage (NAS), or a storage area-network (SAN). Here, the storage 316 includes one or more images 330, one or more structured identifier region of interests (ROIs) 332, confidence information 334, one or more structured identifier images 336, one or more enhanced structured identifier images 338, structured identifier information 340, and one or more image restoration models 342, each of which is described in more detail below. The network interface 318 may be any type of network communications interface (e.g., Ethernet, serial, wireless, etc.) that allows the computing system 155 to communicate with other computers and/or components in a system (e.g., system 100, system 200A, system 200B, system 200C, etc.).

As shown, the memory 314 includes a detector tool 320, an analysis tool 322, an enhancement tool 324, a decoding tool 326, and an audit tool 328, each of which can include software, hardware, or combinations thereof. In one embodiment, the detector tool 320, the analysis tool 322, the enhancement tool 324, the decoding tool 326, and the audit tool 328 are software applications executing on the computing system 155.

The computing system 155 may obtain one or more images 330 captured by the camera devices 160 1-K. The images 330 captured by the camera devices 160 may include high quality images (e.g., high resolution images), low quality images (e.g., low resolution images), or combinations thereof. In a particular embodiment, the camera device(s) 160 captures a high quality image and generates a low quality version of the high quality image by downsampling the high quality image, for example. In another embodiment, the computing system 155 may obtain a high quality image captured by a camera device(s) 160 and may downsample the high quality image in order to generate a low quality version of the high quality image.

The detector tool 320 is generally configured to localize (e.g., identify and locate) the structured identifiers 175 within the images 330. For example, the detector tool 320 may determine, for each image 330, a ROI of a structured identifier 175 (e.g., structured identifier ROI 332) within the image 330. Each ROI may be an approximate region of the image 330 where the structured identifier 175 is located. The detector tool 320 may determine each structured identifier ROI 332 using computer vision techniques, machine learning (ML) techniques, or combinations thereof. In a particular embodiment, the detector tool 320 uses a ML model (e.g., ML-based localizer model) to determine the bounding box of each structured identifier 175 within a respective image 330. The detector tool 320 may use the bounding box within each image 330 as an approximate ROI of the structured identifier 175 within that image.

In addition to determining a ROI of the structured identifier 175 within each image 330, the detector tool 320 may generate a confidence score, indicating a likelihood that the determined ROI of the structured identifier 175 within the respective image 330 is accurate. That is, the confidence score is a measure of the likelihood that a given ROI includes a structured identifier. The confidence scores for a set of images 330 may be collectively referred to confidence information 334. The detector tool 320 may provide the structured identifier ROI(s) 332 along with the associated confidence information 334 to the analysis tool 322.

The analysis tool 322 is generally configured to generate a set of structured identifier images 336, based on the structured identifier ROIs 332. For example, each structured identifier image 336 may include a respective ROI of a structured identifier 175. In one embodiment, each structured identifier image 336 is a cropped image (from one of the images 330) that includes the ROI of a structured identifier 175. Each cropped image may have a padding around the structured identifier. For example, the padding may be X % (e.g., 50%) greater than the width and height of the estimated ROI (e.g., bounding box) of the structured identifier 175.

The analysis tool 322 can generate a structured identifier image 336 using any one or more of the images 330. For example, in one embodiment, assuming the ROI of the structured identifier is determined from a first image 330, the analysis tool 322 can generate a structured identifier image 336 by cropping the ROI of the structured identifier from the same first image 330. In another embodiment, assuming the ROI of the structured identifier is determined from a second image 330, the analysis tool 322 can generate a structured identifier image 336 by cropping the ROI of the structured identifier from a second image 330 that is different from the first image 330. In such an embodiment, the different second image may at least one of (i) have a different viewpoint of the structured identifier than the first image, (ii) have a different level of quality than the first image, or (iii) be captured from a different camera device 160 than the first image. In yet another embodiment, multiple images 330 may be registered into a single image 330, and the analysis tool 322 can generate a structured identifier image 336 by cropping the ROI of the structured identifier from the single image 130.

The enhancement tool 324 is generally configured to enhance the structured identifier image(s) 336 and output an enhanced structured identifier image(s) 338. For example, as described in greater detail below, the enhancement tool 324 may use one or more image restoration models 342 to correct one or more image defects within the structured identifier image(s) 336. Each image restoration model 342 may be configured to perform at least one image enhancement technique, including, but not limited to, size normalization, brightness/contrast adjustment, sharpening/edge enhancement, etc.

In one embodiment, at least one image restoration model 342 is configured to perform a geometric transformation operation to enhance the structured identifier image(s) 336. For example, geometric transformations may be used to rectify the shape of a structured identifier due to perspective and lens distortion, package deformation, structured identifier wrinkling, etc.

In one embodiment, at least one image restoration model 342 is configured to perform a deep learning-based image restoration to enhance the structured identifier image(s) 336. In such an embodiment, the at least one image restoration model 342 may be a deep learning-based model that is trained to recover details of poorly imaged, blurred, or otherwise corrupted structured identifier image(s) 336. Examples of deep learning-based models may include, but are not limited to, generative adversarial networks (GANs), diffusion models, etc.

The decoding tool 326 is generally configured to extract information associated with the structured identifier 175 (referred to herein as structured identifier information 340). The structured identifier information 340 may include symbology used for the structured identifier 175, the detected corners of the structured identifier 175, the decoded text or binary information associated with the structured identifier 175 (e.g., the alphanumeric string or binary information), or combinations thereof. The decoded text or binary information may indicate identifying information for the item (e.g., globally unique identifier), target location information for the item, item attributes, etc. In one embodiment, the decoding tool 326 extracts information associated with the structured identifier 175 from the structured identifier image(s) 336. In another embodiment, the decoding tool 326 extracts information associated with the structured identifier 175 from the enhanced structured identifier images 338.

In one embodiment, the decoding tool 326 uses one or more structured identifier reading algorithms (e.g., barcode reading algorithms) to decode the structured identifier. In another embodiment, the decoding tool 326 uses one or more ML techniques to decode the structured identifier. The decoding tool 326 may provide the extracted structured identifier information to the management system 165, e.g., to obtain identifying information for the item associated with the structured identifier.

The audit tool 328 is generally configured to audit the results of the enhancement process (implemented by the enhancement tool 324) to ensure the enhancement tool is not negatively impacting the decoding process. For example, certain image restoration models (e.g., deep learning-based image restoration models, such as GANs) may produce features in the restored image that are not present in the input image 330. These features may lead to the restoration of visually plausible structured identifiers that are different from the actual structured identifier 175 that was imaged.

Thus, to ensure that the enhancement process is restoring appropriate structured identifiers, the audit tool 328 can audit the results of the decoding of the structured identifier 175 within an enhanced structured identifier image 338. In one embodiment, the audit tool 328 can obtain a set of structured identifier information corresponding to structured identifier images 336 and another set of structured identifier information corresponding to a set of enhanced structured identifier images 338 (corresponding to the set of structured identifier images 336). The audit tool 328 can compare the different sets of structured identifier information to determine whether they are the same. If the audit tool 328 determines that the different sets of structured identifier information match, then audit tool 328 can determine that the enhancement tool 324 is restoring appropriate structured identifiers. On the other hand, if the audit tool 328 determines that the different sets of structured identifier information do not match, then the audit tool 328 can determine that the enhancement tool 324 is not restoring appropriate structured identifiers and may generate and transmit an indication to another computing system.

In some embodiments, the audit process is triggered based on the confidence information 334 associated with a structured identifier ROI 332. For example, when the confidence score (in the confidence information 334) for a given structured identifier ROI 332 is below a threshold, then the audit process may be performed for the structured identifier image 336 and enhanced structured identifier image 338 associated with the structured identifier ROI 332. In some embodiments, the audit process is triggered randomly. In some embodiments, the audit process is triggered randomly based on the confidence information 334 associated with a structured identifier ROI 332.

Figure 4:
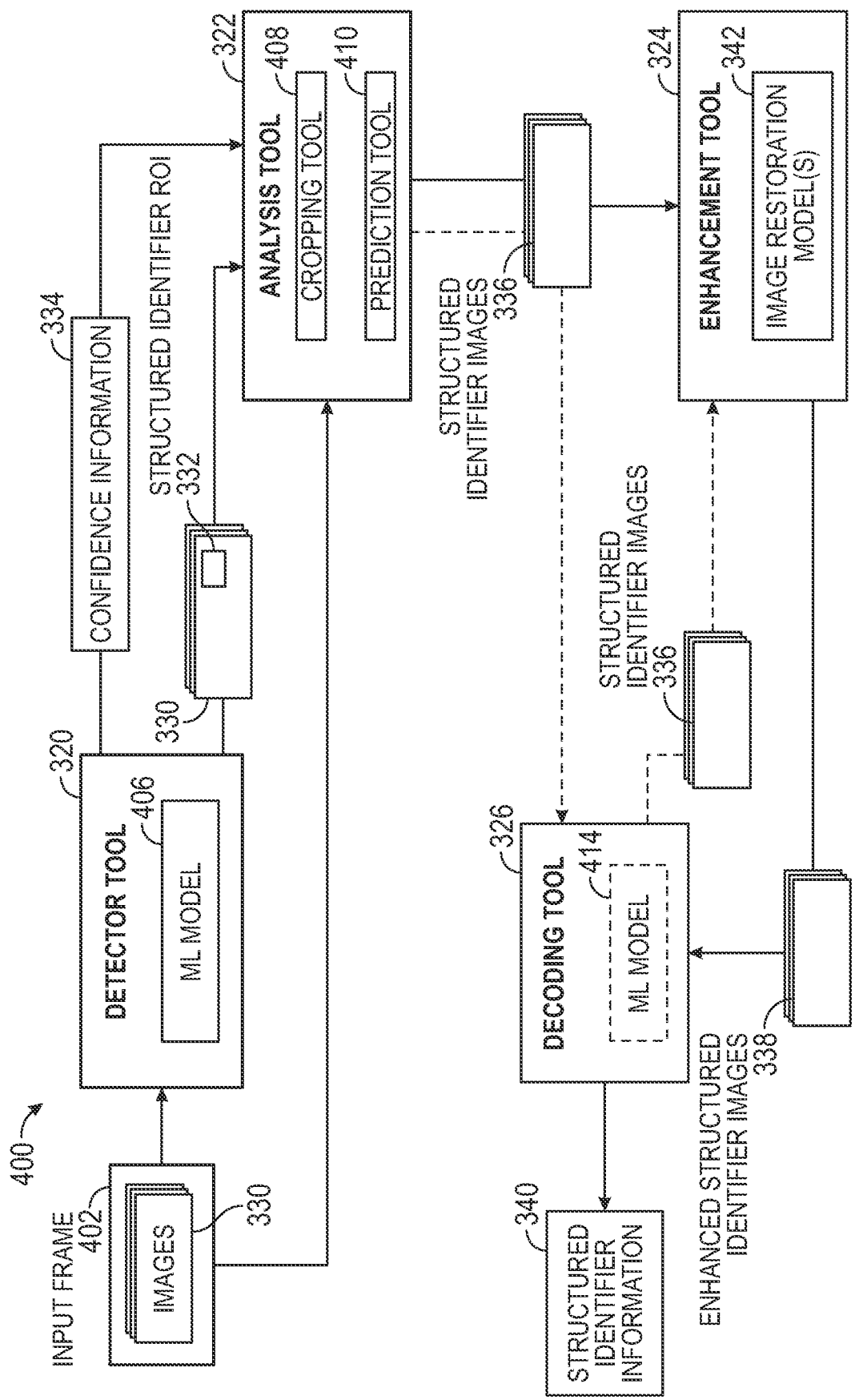
FIG. 4 is a block diagram of an example workflow for reading a structured identifier using a structured identifier reading system, according to one embodiment.

FIG. 4 is a block diagram of an example workflow 400 for reading a structured identifier using a structured identifier reader system 150, according to one embodiment. As shown, at a given time instance, the detector tool 320 receives an input frame 402, which includes an image 330 from each camera device 160. The images 330 may include high quality (e.g., high resolution) images, low quality (e.g., low resolution) images, images having different viewpoints (e.g., taken from different locations), or combinations thereof.

The detector tool 320 includes a ML model 406, which is configured to detect and localize a ROI of a structured identifier 175 within a scene, given an image of the scene as input. Here, for each image 330, the ML model 406 outputs a set of information (e.g., structured identifier ROI 332) indicating the ROI of the structured identifier within the image 330. The ML model 406 also outputs a set of confidence information 334, which includes, for each structured identifier ROI 332, a confidence score indicating a likelihood that the structured identifier ROI 332 includes a structured identifier. In one embodiment, the ROI of the structured identifier can include a label (e.g., shipping label), which includes the structured identifier 175. In some embodiments, the ROI of the structured identifier can include a different region or portion of an item 105. For example, the structured identifier 175 may be affixed to an item 105 without a label.

In one embodiment, the ML model 406 is a ML-based localizer model that outputs, for each image 330, the bounding box of the structured identifier as the ROI of the structured identifier within the image 330. The ML model 406 may use a fully convolutional one-stage object detection (FCOS) architecture. To train the ML model 406, sample images may be captured of operators performing a facility operation (e.g., stow or pick operation). Each image within the sample images may then be annotated with a ROI placed around the structured identifier within the image. The sample images may be annotated by human operator(s) or may be annotated using automated techniques. In one example, an optical scanning decoder (e.g., barcode decoder) can process the sample images to get the localization of the ROI of the structured identifier within each image. Once annotated, the ML model 406 may be trained with the training data (e.g., images, ROI annotations, etc.) using various machine learning algorithms, such as stochastic gradient descent, for example.

Note that while FIG. 4 depicts the detector tool 320 using a ML based approach to localize structured identifiers within images, in other embodiments, the detector tool 320 can use computer-vision technique(s) to localize structured identifiers within images. In such embodiments, the computer-vision technique(s) may involve detecting edges or patterns of edges that can localize the structured identifier.

Figure 5:
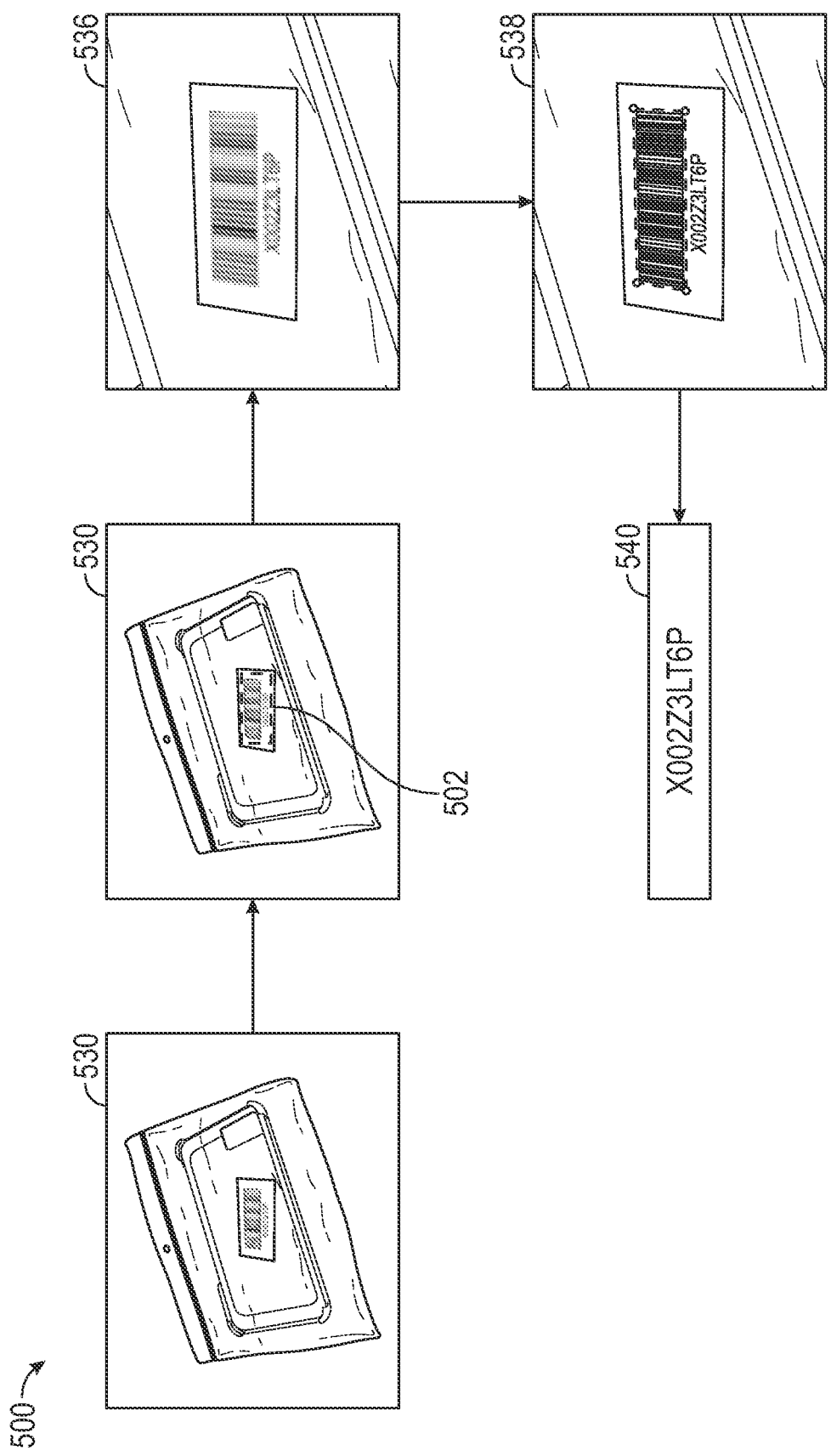
FIG. 5 illustrates an example structured identifier reading process, according to one embodiment.

Briefly referring to FIG. 5, which depicts a reference example of a structured identifier reading process 500, assuming an image 330 is acquired of an item 105 with a potential structured identifier on the item 105, the structured identifier 175 within the image 330 is localized as an axis-oriented bounding box 502 within the image 330 using a ML based localizer model. Note the axis-oriented bounding box 502 is one reference example of the structured identifier ROI 332. For example, while the axis-oriented bounding box 502 is shown as a "rectangle," in other embodiments, the structured identifier ROI 332 can have different shapes (e.g., circles, triangles, etc.).

Referring back to FIG. 4, the analysis tool 322 includes a cropping tool 408, which is configured to use the structured identifier ROI(s) 332 to extract, from an image 330 (of the input frame 402), the corresponding ROI of the structured identifier 175 from the image 330 (referred to as structured identifier image 336). In some embodiments, the structured identifier image 336 is a crop of the image 330 that includes the corresponding ROI of the structured identifier 175. Referring again to FIG. 5, the area around the axis-oriented bounding box 502 is cropped out to generate the cropped image 536 including the structured identifier 175. Note, the cropped image 536 is a reference example of a structured identifier image 336. Here, the axis-oriented bounding box 502 is cropped out with padding around the axis-oriented bounding box 502 (e.g., the padding may be 50% more than the width and height of the axis-oriented bounding box 502).

As noted, in some embodiments, the image 330 that is used to localize the structured identifier 175 is the same image 330 that is used to extract the ROI of the structured identifier. However, in other embodiments, the image 330 that is used to localize the structured identifier 175 is a different image from the image 330 that is used to extract the ROI of the structured identifier. For example, for computational efficiency, the detector tool 320 can operate on lower quality images to determine the structured identifier ROI(s) 332, and the analysis tool 322 can use higher quality images to crop out the ROI of the structured identifiers. In another example, the detector tool 320 can use an image from a first camera device 160 (in a first location) and the analysis tool 322 can use another different image from a second camera device 160 (in a second different location). In general, the detector tool 320 and the analysis tool 322 can use any set of images 330, respectively, as long as the structured identifier ROI 332 localized in one image 330 can be mapped to coordinates in the other image 330, allowing the ROI of the structured identifier to be extracted from the other image 330.

In some embodiments, the structured identifier image 336 may be an entire image 330. For example, the structured identifier image 336 may be the entire image 330 when the padding around the ROI is sufficiently large to cover the entire image 330. In such cases, the analysis tool 322 may refrain from using the cropping tool 408 to extract the ROI of the structured identifier from an image 330.

As shown in FIG. 4, the analysis tool 322 provides the structured identifier images 336 to the enhancement tool 324, which uses one or more image restoration models 342 to correct one or more image defects within the structured identifier images 336. Referring to FIG. 5, assuming the enhancement tool 324 receives the structured identifier image 536, the enhancement tool 324 may generate an enhanced structured identifier image 538 to facilitate decoding of the structured identifier within the enhanced structured identifier image 538. Note, the enhanced structured identifier image 538 is a reference example of an enhanced structured identifier image 338.

Referring back to FIG. 4, the enhancement tool 324 can use the image restoration models 342 to perform a variety of image enhancement techniques. FIGS. 6A-6G illustrate various different image enhancement techniques that can be performed using an image restoration model 342, according to various embodiments.

Figure 6A:
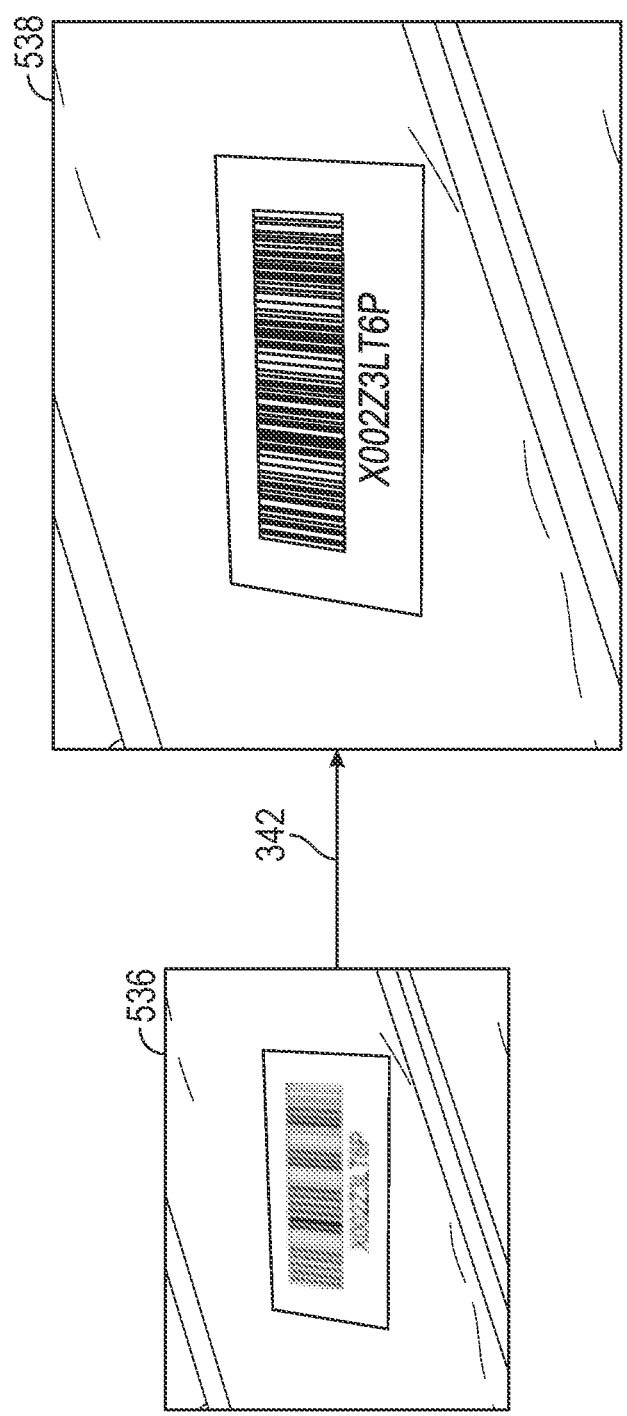
FIGS. 6A-6G illustrate different examples of image enhancement techniques, according to various embodiments.
Figure 6B:
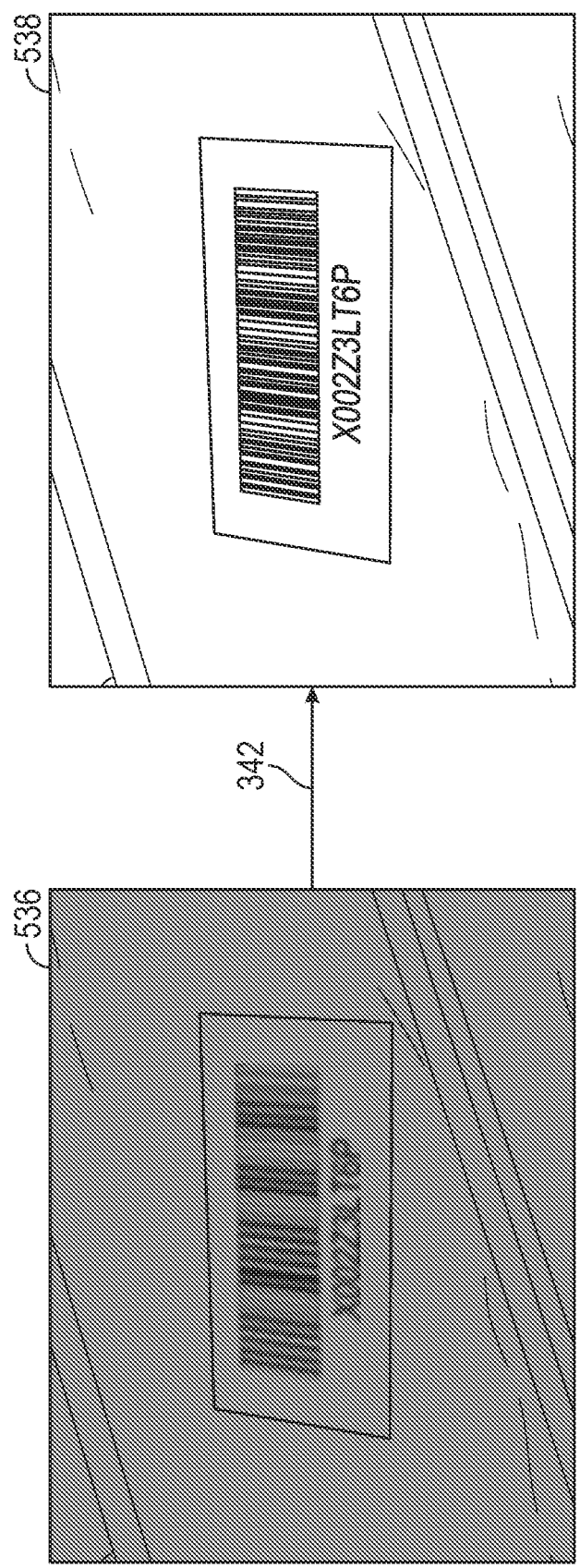
Figure 6C:
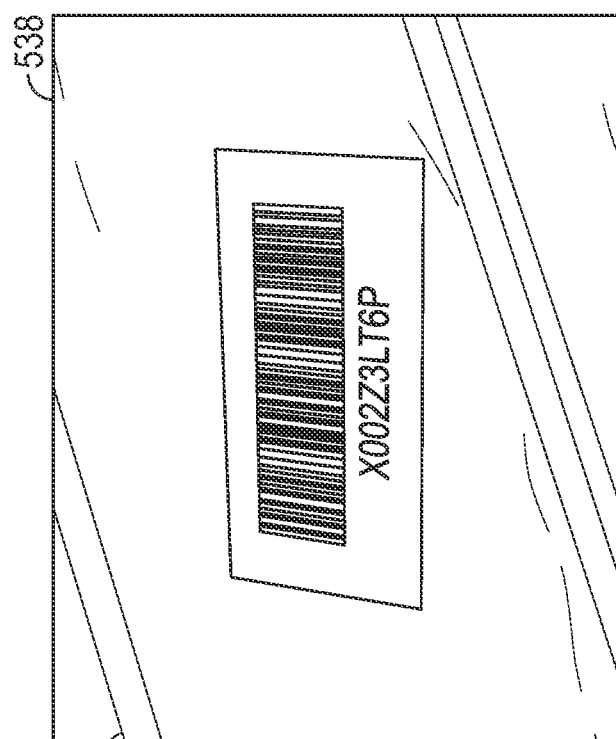
Figure 6C:
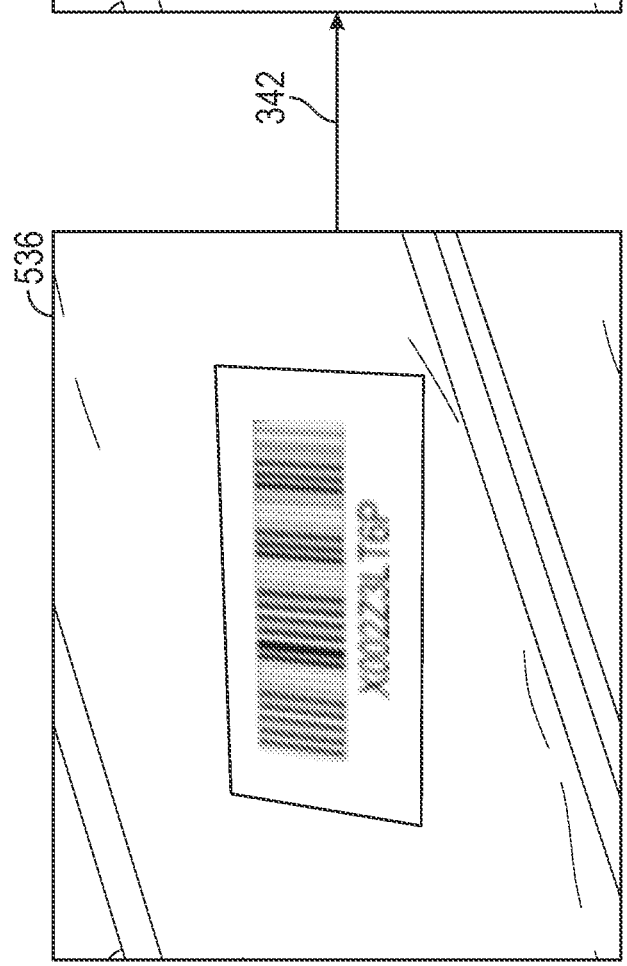

FIG. 6A, for example, illustrates an example of an image restoration model 342 performing a size normalization on a structured identifier image 536 to generate an enhanced structured identifier image 538. FIG. 6B illustrates an example of an image restoration model 342 performing a brightness/contrast adjustment on a structured identifier image 536 to generate an enhanced structured identifier image 538. FIG. 6C illustrates an example of an image restoration model 342 performing a sharpening/edge enhancement on a structured identifier image 536 to generate an enhanced structured identifier image 538.

Figure 6D:
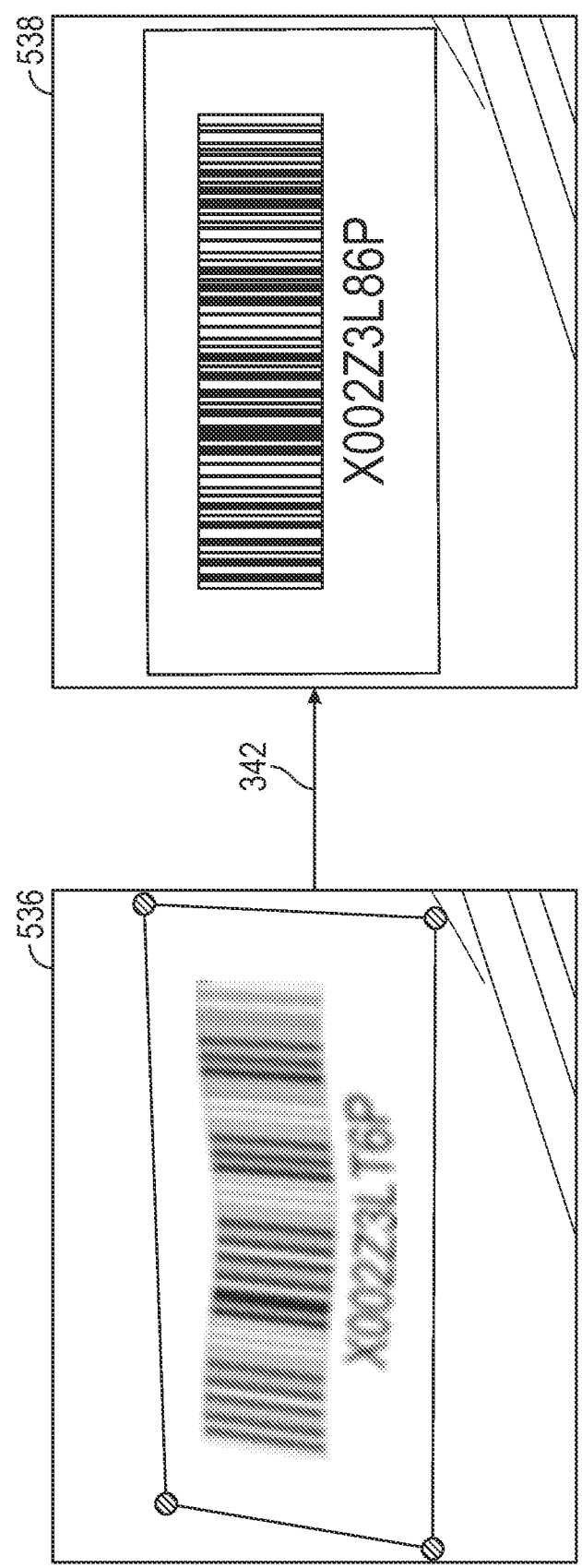
Figure 6E:
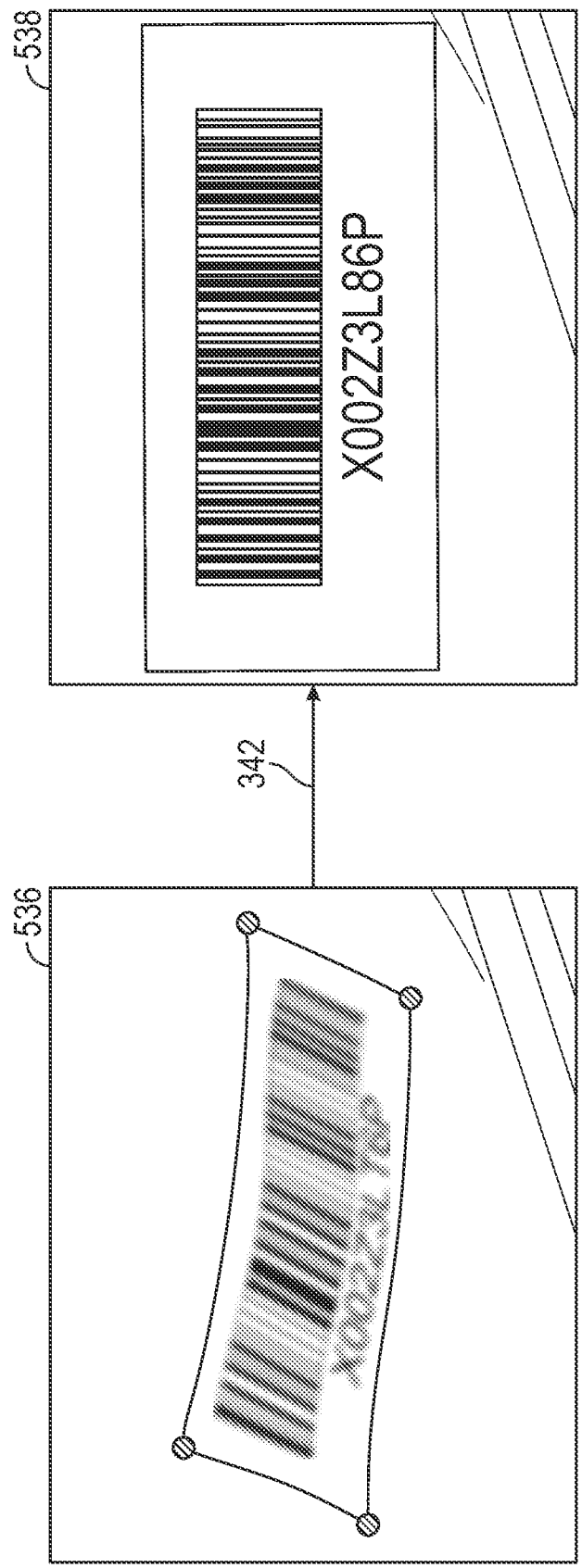

In some embodiments, the image restoration model(s) 342 can be configured to use a geometric transformation as an image enhancement technique. Geometric transformations may be used to rectify the shape of a structured identifier due to perspective and lens distortion, item deformation, structured identifier wrinkling, etc. FIG. 6D illustrates an example of an image restoration model 342 performing a geometric transformation on a structured identifier image 536 to generate an enhanced structured identifier image 538. FIG. 6E illustrates another example of an image restoration model 342 performing a geometric transformation on a structured identifier image 536 to generate an enhanced structured identifier image 538. In FIGS. 6D and 6E, the geometric transformation involves detecting four corners of a region and de-warping the region to an axis-oriented rectangle.

Figure 6F:
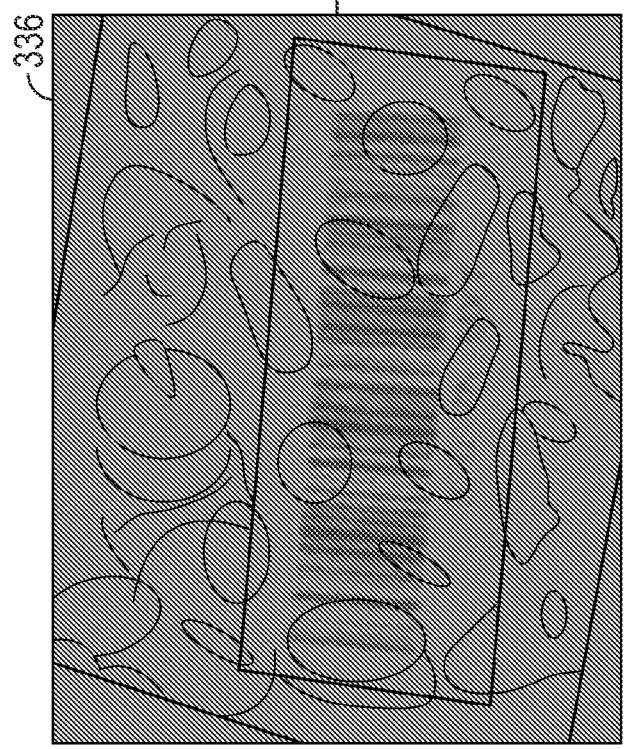
Figure 6F:
Figure 6G:
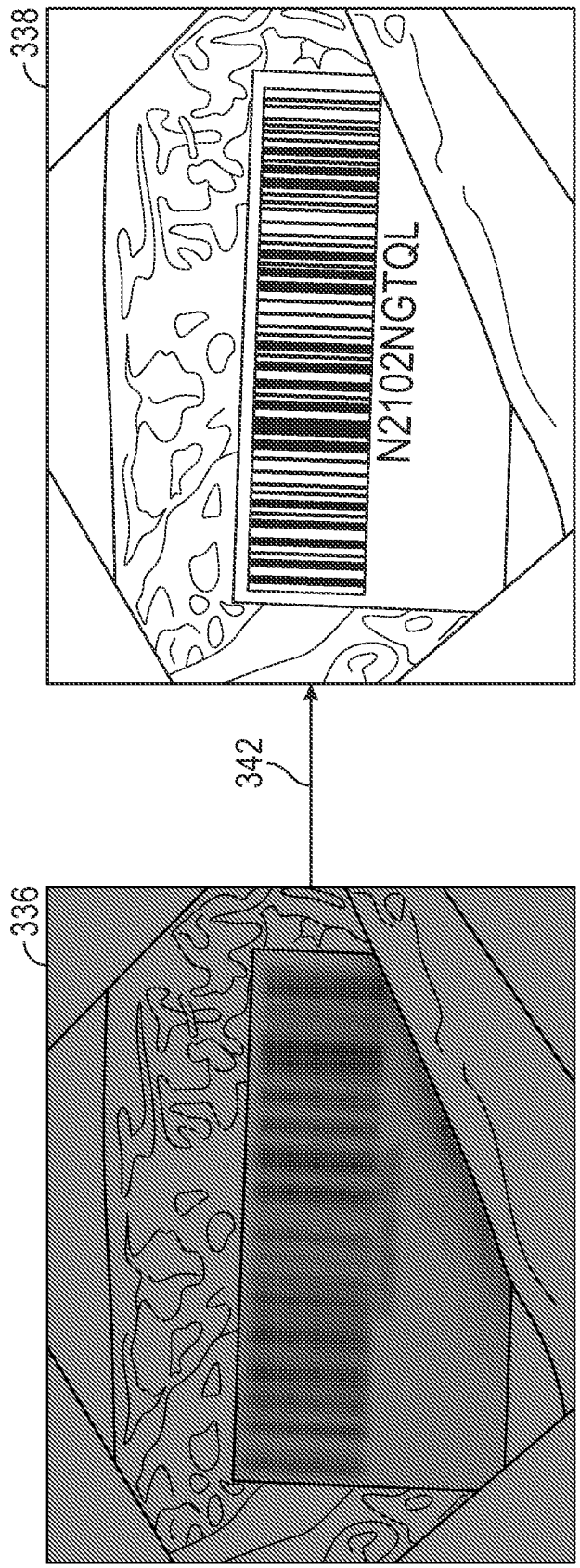

In some embodiments, the image restoration model(s) 342 may be configured to use deep learning-based image restoration as an image enhancement technique. For example, the image restoration model(s) 342 may be a deep learning-based model, such as a GAN, diffusion model, etc. In general, a deep-learning-based image restoration may be able to compensate for a larger set of image corruption effects than the image enhancement techniques illustrated in FIGS. 6A-6E. FIG. 6F, for example, illustrates an example of an image restoration model 342 performing a deep learning-based image restoration of a structured identifier image 336, which has been heavily JPEG compressed, to generate an enhanced structured identifier image 338. FIG. 6G illustrates another example of an image restoration model 342 performing a deep learning-based restoration of a structured identifier image 336, which is a blurred image, to generate an enhanced structured identifier image 338.

In embodiments where the image restoration model(s) 342 is a deep learning-based model, the deep learning-based model may be trained by creating datasets consisting of high quality original images and low quality corrupted images. The datasets may be created from cropped regions of larger images. The cropped regions may be chosen from a combination of set of images that contain structured identifiers and a set of images that do not contain structured identifiers. The low quality counterparts to the cropped regions may be created using a variety of image augmentation transforms, including, but not limited to, focal and motion blur, JPEG artifacts, shutter effects, brightness, contrast, and other image processing corruption methods.

Figure 7:
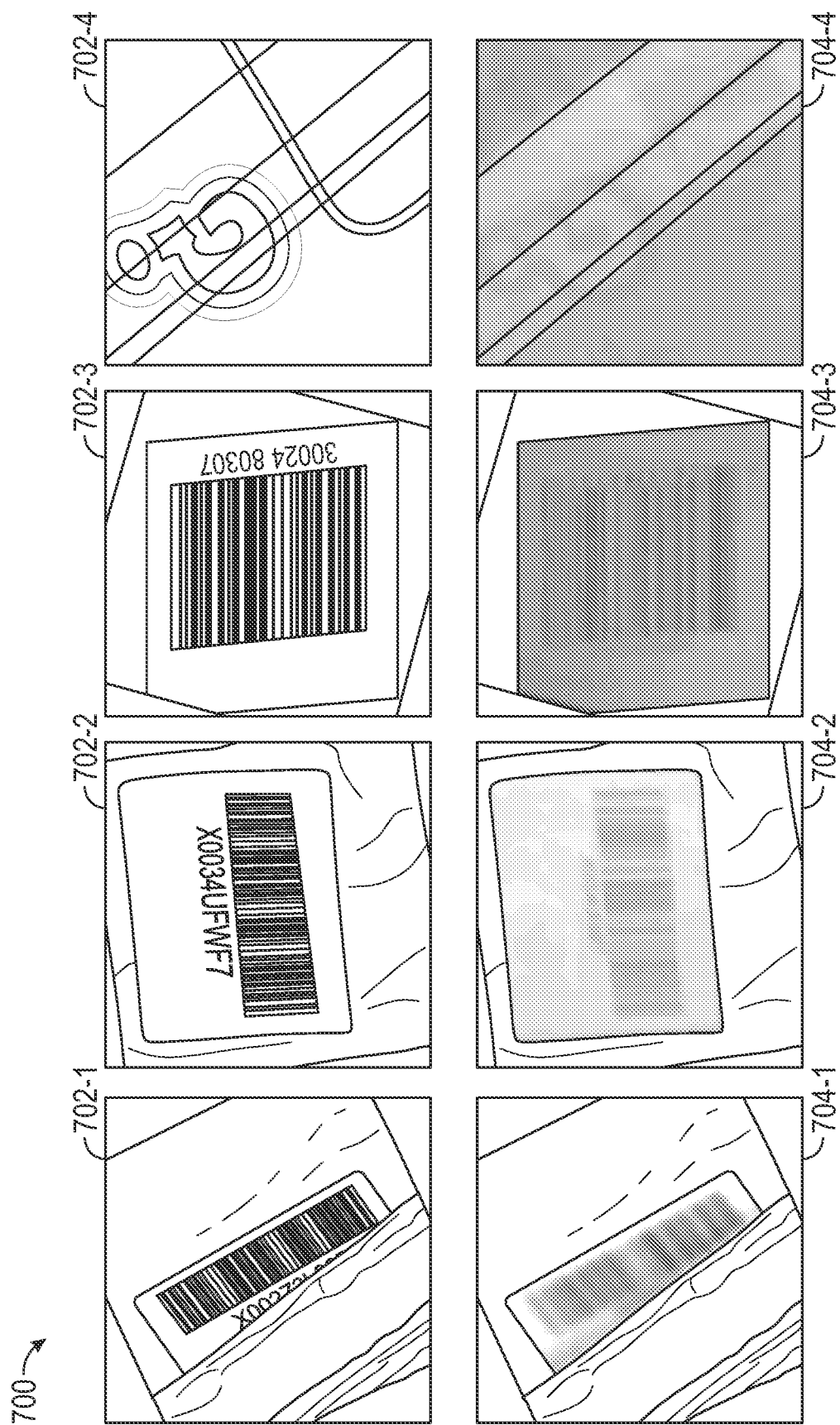
FIG. 7 illustrates an example of an image dataset for training an image restoration model, according to one embodiment.

FIG. 7 illustrates an example dataset 700 for training a deep learning-based model, such as GAN, diffusion model, etc., according to one embodiment. Here, the dataset 700 includes a set of high quality images 702 1-4 and a corresponding set of low quality images 704 1-4. The high quality images 702 1-4 are high quality crops taken from imagery consisting of a mixture of structured identifiers and other regions. For example, high quality images 702 1-3 are different images of structured identifiers and high quality image 702-4 is an image of a region that does not include a structured identifier. The low quality images 704 1-4 are generated by using an image augmentation transform on the high quality images 702 1-4, respectively.

To train the deep learning-based model, the images 702 and 704 are fed in pairs consisting of the high quality cropped original (e.g., high quality image 702) and its low quality corrupted counterpart (e.g., low quality image 704). The output is a model trained to take as input a low quality, possibly corrupted image, and reconstruct a high quality representation of the image.

Referring back to FIG. 4, in one embodiment, the enhancement tool 324 can use different image enhancement techniques (via the image restoration model(s) 342) independently of each other to enhance a structured identifier image 336. In another embodiment, the enhancement tool 324 can chain together one or more different image enhancement techniques (via the image restoration model(s) 342) in an enhancement pipeline to enhance a structured identifier image 336.

In one embodiment, the enhancement tool 324 can be configured to selectively apply different image enhancement techniques (via the image restoration model(s) 342) based on the type of image defect (or corruption). For example, if the detected structured identifier is heavily distorted, then the enhancement tool 324 may apply geometric transforms to rectify the structured identifier. In another example, if a histogram of the structured identifier image 336 is unbalanced, then an image processing-based restoration technique (e.g., size normalization depicted in FIG. 6A) may be used to normalize the histogram.

As shown in FIG. 4, the enhancement tool 324 provides the enhanced structured identifier images 338 to the decoding tool 326, which is configured to determine structured identifier information 340, based on reading the structured identifier(s) 175 in the enhanced structured identifier images 338. In one embodiment, the decoding tool 326 uses one or more structured identifier reading algorithms to obtain the structured identifier information 340. In another embodiment, the decoding tool 326 uses a ML model 414 to obtain the structured identifier information 340. Briefly referring to FIG. 5, assuming the decoding tool 326 receives the enhanced structured identifier image 538, the decoding tool 326 may read the structured identifier within the enhanced structured identifier image 538 to obtain the structured identifier information 540, which is a reference example of the structured identifier information 340.

In some cases, using the enhancement tool 324 to enhance each structured identifier image 336 can be computationally expensive, e.g., in terms of system latency, processing power, etc. As such, in some embodiments, the enhancement tool 324 may be configured to perform an enhancement of a structured identifier image 336 when a predetermined condition is satisfied. In one embodiment, the predetermined condition is based on whether a structured identifier has been successfully decoded from a structured identifier image 336. As shown in FIG. 4, for example, instead of the analysis tool 322 providing the structured identifier images 336 to the enhancement tool 324, the analysis tool 322 may provide the structured identifier images 336 to the decoding tool 326. If the decoding tool 326 is able to successfully decode a structured identifier from the structured identifier images 336, then the enhancement tool 324 may not be applied or implemented. On the other hand, if the decoding tool 326 is unable to successfully decode a structured identifier from the structured identifier images 336, then the decoding tool 326 can send the structured identifier images 336 to the enhancement tool 324 for an enhancement process.

Additionally or alternatively, in one embodiment, the predetermined condition is based on a prediction of whether a structured identifier can be successfully decoded from a structured identifier image 336. For example, the confidence score associated with a structured identifier ROI 332 can be used as a prediction of whether a structured identifier can be successfully decoded from a structured identifier image 336 generated by the analysis tool 322. In one embodiment, the analysis tool 322 includes a prediction tool 410, which is configured to (i) predict (or determine) that the structured identifier will not be successfully decoded when the confidence score associated with a structured identifier ROI 332 is below a threshold and (ii) predict (or determine) that the structured identifier will be successfully decoded when the confidence score associated with a structured identifier ROI 332 is greater than or equal to a threshold. The analysis tool 322 may provide the structured identifier images 336 directly to the decoding tool 326, when it is predicted that the structured identifier will be successfully decoded. On the other hand, the analysis tool 322 may provide the structured identifier images 336 to the enhancement tool 324, when it is predicted that the structured identifier will not be successfully decoded.

By selectively triggering the enhancement tool 324 to perform enhancement of structured identifier images 336 when certain conditions are satisfied, embodiments enable the structured identifier reader system 150 to significantly reduce consumption of time and compute resources.

In some embodiments, an audit of the enhancement performed by the enhancement tool 324 is performed to ensure that the enhancement process is restoring appropriate structured identifiers.

Figure 8:
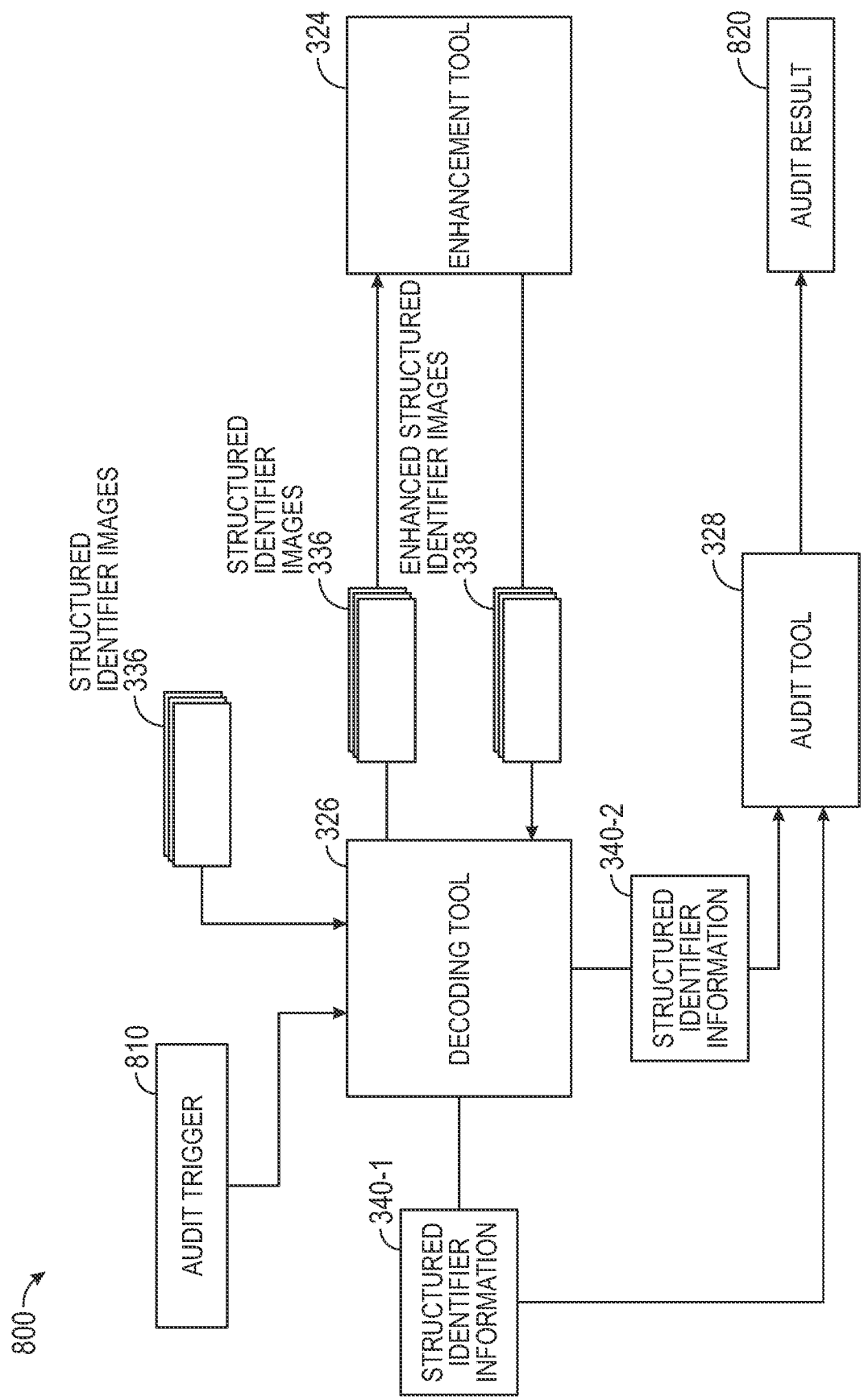
FIG. 8 is a block diagram of an example workflow for auditing a process for enhancing structured identifier images, according to one embodiment.

FIG. 8 is a block diagram of an example workflow 800 for auditing a process for enhancing structured identifier images 336, according to one embodiment. As shown, the decoding tool 326 receives a set of structured identifier images 336 and an audit trigger 810. The audit trigger 810 may include an indication of when the decoding tool 326 is to trigger an audit of the process for enhancing structured identifier images 336. In one embodiment, the audit trigger 810 is based on a confidence score associated with a structured identifier ROI 332. For example, the decoding tool 326 may trigger the audit when the confidence score associated with a structured identifier ROI 332 is below a threshold. In another embodiment, the audit trigger 810 indicates at least one of a predetermined time interval (e.g., every 10 minutes or some other amount of time) or a predetermined number of captured images (e.g., every 10 images or some other number of images) for triggering the audit. In yet another embodiment, the audit trigger 810 indicates that the audit should be randomly performed.

When the audit is triggered, the decoding tool 326 may decode a set of structured identifier images 336 to obtain a first set of structured identifier information 340-1. The decoding tool 326 may also provide the set of structured identifier images 336 to the enhancement tool 324 to undergo an enhancement process, and receive a set of enhanced structured identifier images 338. The decoding tool 326 may decode the set of enhanced structured identifier images 338 to obtain a second set of structured identifier information 340-2. The decoding tool 326 may provide the first and second sets of structured identifier information 340 1-2 to the audit tool 328. The audit tool 328 may compare the first and second sets of structured identifier information 340 1-2 and output an audit result 820 indicating whether the first and second sets of structured identifier information 340 1-2 match.

Figure 9:
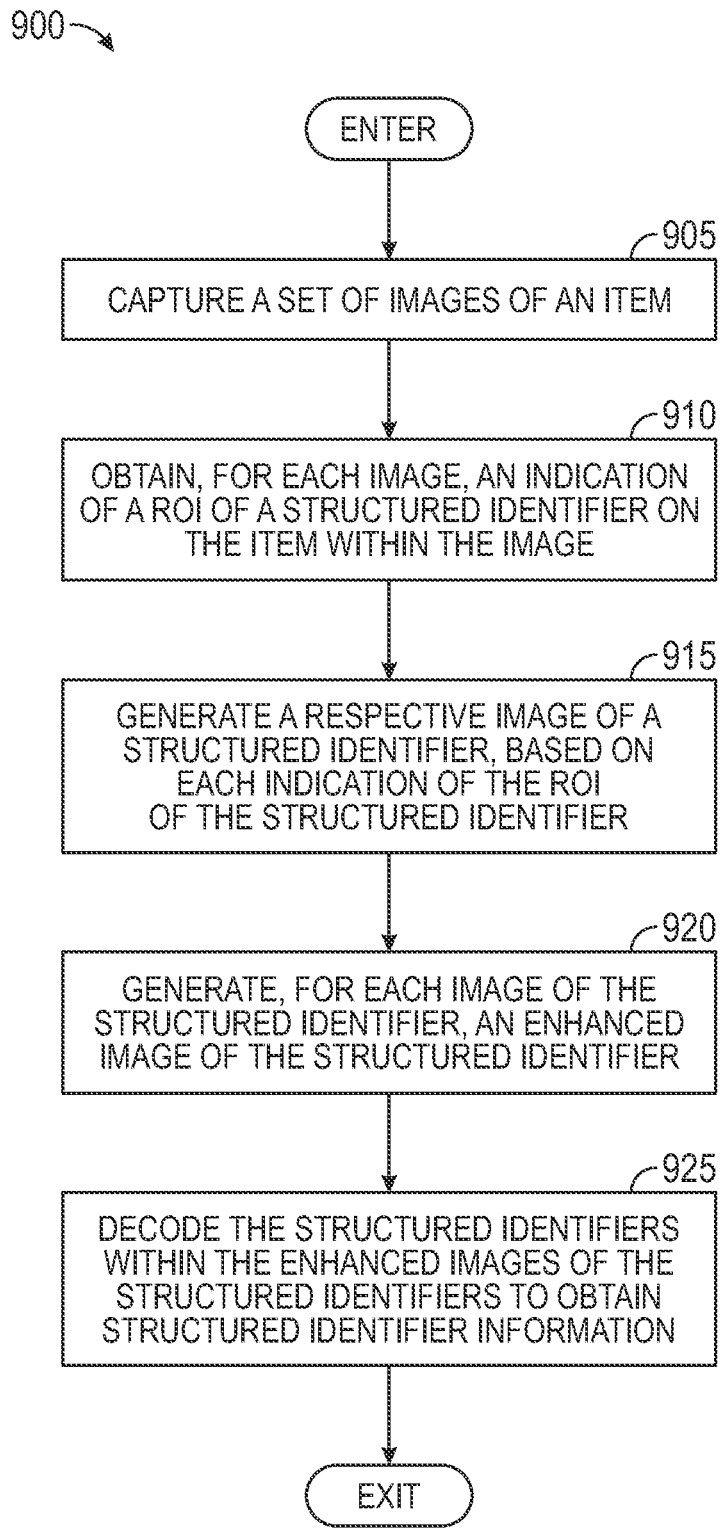
FIG. 9 is a flowchart of a method for reading a structured identifier on an item, according to one embodiment.

FIG. 9 is a flowchart of a method 900 for reading a structured identifier (e.g., structured identifier 175) on an item (e.g., item 105), according to one embodiment. The method 900 may be performed by one or more components of a structured identifier reader system (e.g., structured identifier reader system 150).

Method 900 may enter at block 905, where the structured identifier reader system captures a set of images (e.g., images 330) of an item. At block 910, the structured identifier reader system obtains, for each image in the set of images, an indication of a ROI of a structured identifier (e.g., structured identifier ROI 332) on the item within the image. As noted, in some embodiments, the ROI of the structured identifier may include a bounding box (e.g., axis-oriented bounding box 502) of the structured identifier. The operations in block 910 are described in more detail with respect to FIG. 4.

At block 915, the structured identifier reader system generates a respective image of a structured identifier (e.g., structured identifier image 336), based on each indication of the ROI of the structured identifier. In one embodiment, each respective image of the structured identifier is a resized version of an image of the structured identifier captured by the structured identifier reader system. For example, each image of the structured identifier may be a cropped image that includes the ROI of the structured identifier. The operations in block 915 are described in more detail with respect to FIG. 4.

At block 920, the structured identifier reader system generates, for each image of the structured identifier, an enhanced image of the structured identifier (e.g., enhanced structured identifier image 338), e.g., based on using at least one image restoration model (e.g., image restoration model 342) to correct one or more image defects within the image of the structured identifier. The operations in block 920 are described in more detail with respect to FIG. 4.

At block 925, the structured identifier reader system decodes the structured identifiers within the enhanced images of the structured identifiers to obtain structured identifier information (e.g., structured identifier information 340). The operations in block 925 are described in more detail with respect to FIG. 4.

Figure 10:
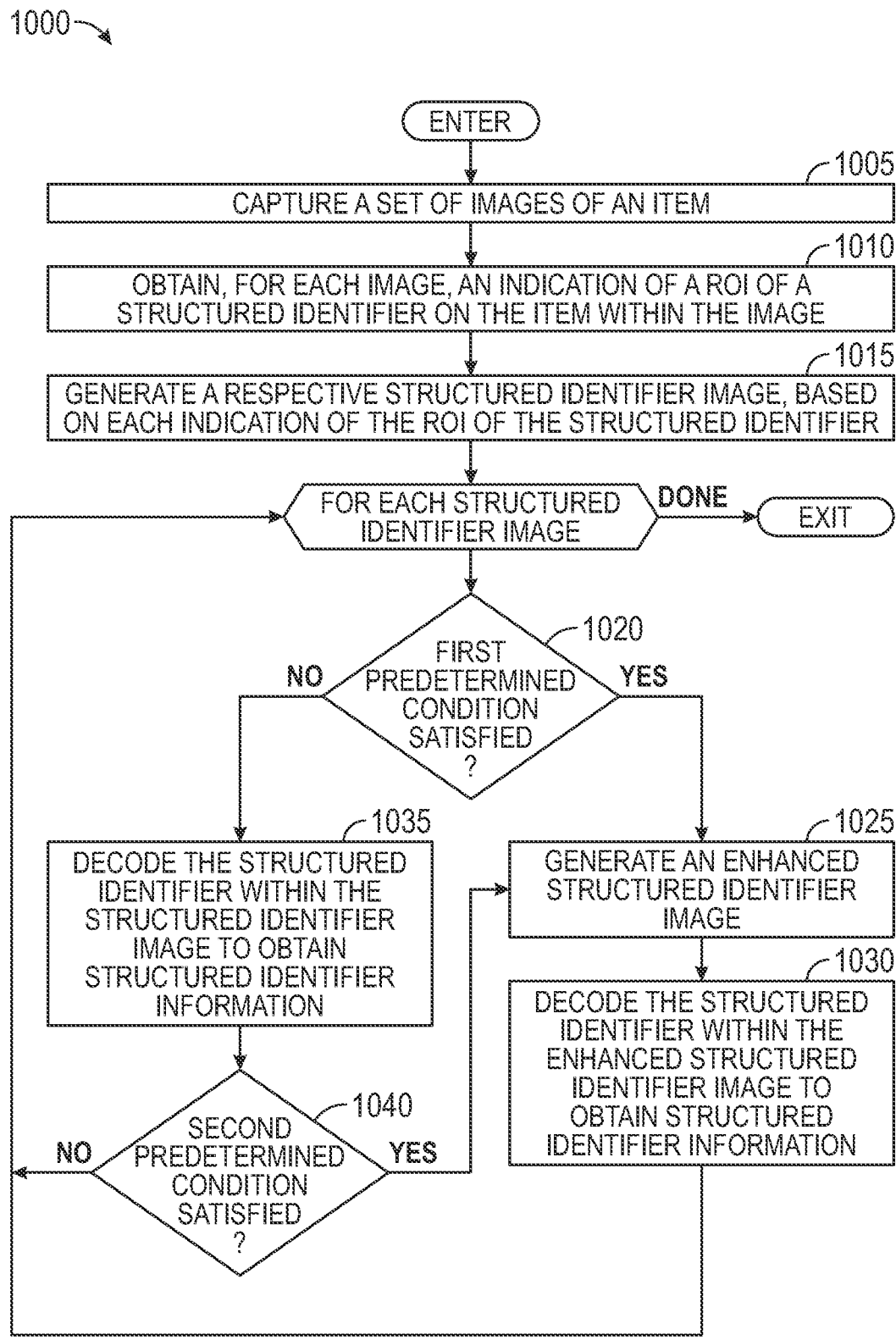
FIG. 10 is a flowchart of another method for reading a structured identifier on an item, according to one embodiment.

FIG. 10 is a flowchart of a method 1000 for reading a structured identifier (e.g., structured identifier 175) on an item (e.g., item 105), according to one embodiment. The method 1000 may be performed by one or more components of a structured identifier reader system (e.g., structured identifier reader system 150).

Method 1000 may enter at block 1005, where the structured identifier reader system captures a set of images (e.g., images 330) of an item. At block 1010, the structured identifier reader system obtains, for each image in the set of images, an indication of a ROI of a structured identifier (e.g., structured identifier ROI 332) on the item within the image. As noted, in some embodiments, the ROI of the structured identifier may include a bounding box (e.g., axis-oriented bounding box 502) of the structured identifier. The operations in block 1010 are described in more detail with respect to FIG. 4.

At block 1015, the structured identifier reader system generates a respective image of a structured identifier (e.g., structured identifier image 336), based on each indication of the ROI of the structured identifier. For example, each image of the structured identifier may be a cropped image that includes the ROI of the structured identifier. The operations in block 1015 are described in more detail with respect to FIG. 4.

One or more of the operations in blocks 1020, 1025, 1030, 1035, and 1040 may be performed for each structured identifier image. Note that while FIG. 10 depicts each structured identifier image being processed in succession (with blocks 1020, 1025, 1030, 1035, and/or 1040), in certain embodiments, each structured identifier image may be processed (with blocks 1020, 1025, 1030, 1035, and/or 1040) substantially concurrently.

At block 1020, the structured identifier reader system determines whether a first predetermined condition associated with performing enhancement is satisfied. The first predetermined condition may be based on a confidence score(s) associated with a structured identifier ROI(s). For example, the first predetermined condition may be satisfied when the confidence score associated with the ROI of the structured identifier is less than a threshold. On the other hand, the first predetermined condition may not be satisfied when the confidence score associated with the ROI of the structured identifier is greater than or equal to a threshold.

If, at block 1020, the first predetermined condition is satisfied, then the structured identifier reader system generates an enhanced structured identifier image (e.g., enhanced structured identifier image 338) (block 1025). At block 1030, the structured identifier reader system decodes the structured identifier within the enhanced structured identifier image to obtain structured identifier information (e.g., structured identifier information 340).

If, at block 1020, the first predetermined condition is not satisfied, then the structured identifier reader system decodes the structured identifier within the structured identifier image to obtain structured identifier information (block 1035). At block 1040, the structured identifier reader system determines whether a second predetermined condition associated with performing enhancement is satisfied. The second predetermined condition may be based on a quality of the structured identifier information obtained in block 1035. For example, if the structured identifier information is unreadable or the structured identifier reader system is otherwise unable to successfully obtain valid structured identifier information, then the second predetermined condition may be satisfied.

If, at block 1040, the second predetermined condition is satisfied, then the method proceeds to block 1025. If, at block 1040, the second predetermined condition is not satisfied, then the method returns to evaluate a next available structured identifier image.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the features and elements described herein, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments and advantages described herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A system comprising:
    a plurality of camera devices configured to capture a set of images of an item with a structured identifier; and
    a computing system coupled to the plurality of camera devices and configured to:
        determine, for at least a first image of the set of images, a region of interest (ROI) of the structured identifier within the first image;
        generate a second image, based on the ROI of the structured identifier, the second image comprising the ROI of the structured identifier;
        performing a first decode attempt of the structured identifier from the second image;
        upon determining that the first decode attempt has failed, generating an enhanced version of the second image, based on processing the second image with a deep learning-based image restoration model; and
        performing a second decode attempt of the structured identifier from the enhanced version of the second image to obtain data corresponding to the structured identifier.

2. The system of claim 1, wherein the enhanced version of the second image is further generated upon predicting, prior to performing the first decode attempt, that the first decode attempt will be unsuccessful.

3. The system of claim 2, wherein predicting that the first decode attempt will be unsuccessful comprises determining that a confidence score associated with the ROI of the structured identifier is less than a threshold.

4. The system of claim 1, wherein generating the second image comprises extracting the ROI of the structured identifier from the first image of the set of images.

5. The system of claim 1, wherein:
    generating the second image comprises extracting the ROI of the structured identifier from a third image of the set of images; and
    the first image of the set of images is different from the third image of the set of images.

6. The system of claim 5, wherein at least one of: (i) the first image is captured from a first camera device of the plurality of camera devices and the third image is captured from a different second camera device of the plurality of camera devices; (ii) the first image comprises a different viewpoint of the item with the structured identifier than the third image; or (iii) the first image has a different level of quality than the third image.

7. The system of claim 1, wherein the second image is a resized version of the first image.

8. A computer-implemented method comprising:
    obtaining a set of images of an item with a structured identifier;
    determining, for at least a first image of the set of images, a region of interest (ROI) of the structured identifier within the first image;
    generating a second image, based on the ROI of the structured identifier, the second image comprising the ROI of the structured identifier;
    generating an enhanced version of the second image, based on processing the second image with at least one deep learning-based image restoration model; and
    decoding the structured identifier from the enhanced version of the second image to obtain first data corresponding to the structured identifier.

9. The computer-implemented method of claim 8, further comprising:
    determining at least one image enhancement technique to apply to the second image, based on one or more defects of the second image; and
    selecting, from a plurality of image restoration models, a first image restoration model associated with the at least one image enhancement technique as the at least one deep learning-based image restoration model.

10. The computer-implemented method of claim 9, wherein processing the second image with the at least one deep learning-based image restoration model comprises using the at least one deep learning-based image restoration model to apply the at least one image enhancement technique to the second image.

11. The computer-implemented method of claim 8, further comprising performing an audit of the generation of the enhanced version of the second image.

12. The computer-implemented method of claim 11, wherein the audit is performed upon determining that a predetermined condition is satisfied.

13. The computer-implemented method of claim 12, wherein the predetermined condition comprises at least one of (i) determining that a confidence score associated with the ROI of the structured identifier is less than a threshold or (ii) determining that the second image has been randomly selected.

14. The computer-implemented method of claim 11, wherein performing the audit comprises:
  decoding the structured identifier from the second image to obtain second data corresponding to the structured identifier;
  comparing the first data with the second data; and
  generating, based on the comparison, an indication of whether the first data is the same as the second data.

15. The computer-implemented method of claim 8, wherein the at least one deep learning-based image restoration model is a generative adversarial network or a diffusion model.

16. The computer-implemented method of claim 8, wherein the at least one deep learning-based image restoration model is configured to apply one or more image processing techniques to the second image.

17. The computer-implemented method of claim 16, wherein the one or more image processing techniques comprises at least one of (i) a size normalization, (ii) a brightness adjustment, (iii) a contrast adjustment, (iv) a sharpening adjustment, or (v) an edge adjustment.

18. The computer-implemented method of claim 8, wherein the at least one deep learning-based image restoration model is configured to apply at least one geometric transform to the second image.

19. The computer-implemented method of claim 8, wherein the second image is a resized version of the first image.

20. A computer-readable storage medium storing instructions, which, when executed on one or more computer processors, perform an operation comprising:
  obtaining a set of images of an item with a structured identifier;
  determining, for at least a first image of the set of images, a region of interest (ROI) of the structured identifier within the first image;
  generating a second image, based on the ROI of the structured identifier, the second image comprising the ROI of the structured identifier;
  generating an enhanced version of the second image, based on processing the second image with at least one deep learning-based image restoration model; and
  decoding the structured identifier from the enhanced version of the second image to obtain first data corresponding to the structured identifier.

* * * * *